(12) United States Patent
Kalhan et al.

(10) Patent No.: US 10,772,108 B2
(45) Date of Patent: Sep. 8, 2020

(54) COVERAGE TRANSITION INDICATOR FOR DEVICE-TO-DEVICE COMMUNICATION

(71) Applicant: Kyocera Corporation, Kyoto (JP)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/861,341

(22) Filed: Jan. 3, 2018

(65) Prior Publication Data

US 2018/0132256 A1    May 10, 2018

Related U.S. Application Data

(63) Continuation of application No. 15/105,493, filed as application No. PCT/US2014/071276 on Dec. 18, 2014, now Pat. No. 9,894,671.

(Continued)

(51) Int. Cl.
*H04W 72/10* (2009.01)
*H04L 29/08* (2006.01)
(Continued)

(52) U.S. Cl.
CPC .......... *H04W 72/10* (2013.01); *H04L 67/104* (2013.01); *H04W 4/08* (2013.01); *H04W 4/70* (2018.02);
(Continued)

(58) Field of Classification Search
CPC . H04W 72/10; H04W 24/08; H04W 36/0022; H04W 36/0061; H04W 36/30; H04W 36/36; H04W 4/08; H04W 4/70; H04W 48/14; H04W 56/001; H04W 72/0413; H04W 72/0453; H04W 72/048; H04W 72/1278; H04W 76/14; H04W 72/1215; H04W 88/02; H04W 88/08; H04W 8/005; H04W 92/18; H04W 88/04;
(Continued)

(56) References Cited

U.S. PATENT DOCUMENTS 9,699,767 B2 * 7/2017 Adachi ................. H04W 72/06
10,187,862 B2 * 1/2019 Byun ................. H04W 56/0015
(Continued)

FOREIGN PATENT DOCUMENTS

KR  1020110103852 A  9/2011
KR  1020120074247 A  7/2012
(Continued)

OTHER PUBLICATIONS

Li et al. U.S. Appl. No. 61/953,436, filed Mar. 14, 2014, hereinafter Prov'436 (Year: 2014).*

(Continued)

*Primary Examiner* — Wutchung Chu

(57) ABSTRACT

A User Equipment (UE) D2D device transmits a coverage transition indicator when the UE device leaves a service area of base station and is no longer in coverage. The coverage transition indicator at least indicates that the UE device has left the service area and is no longer in coverage. Based on the coverage transition indicator, a determination can be made as to whether the D2D group to which the UE device belongs has transitioned to an out of coverage scenario from a partial coverage scenario.

6 Claims, 7 Drawing Sheets

Related U.S. Application Data

(60) Provisional application No. 61/919,284, filed on Dec. 20, 2013.

(51) Int. Cl.
| | | |
|---|---|---|
| *H04W 56/00* | (2009.01) | |
| *H04W 4/70* | (2018.01) | |
| *H04W 76/14* | (2018.01) | |
| *H04W 72/12* | (2009.01) | |
| *H04W 36/00* | (2009.01) | |
| *H04W 48/14* | (2009.01) | |
| *H04W 72/04* | (2009.01) | |
| *H04W 24/08* | (2009.01) | |
| *H04W 36/30* | (2009.01) | |
| *H04W 36/36* | (2009.01) | |
| *H04W 4/08* | (2009.01) | |
| *H04W 88/02* | (2009.01) | |
| *H04W 88/08* | (2009.01) | |

(52) U.S. Cl.
CPC ....... *H04W 24/08* (2013.01); *H04W 36/0022* (2013.01); *H04W 36/0061* (2013.01); *H04W 36/30* (2013.01); *H04W 36/36* (2013.01); *H04W 48/14* (2013.01); *H04W 56/001* (2013.01); *H04W 56/0015* (2013.01); *H04W 72/048* (2013.01); *H04W 72/0413* (2013.01); *H04W 72/0453* (2013.01); *H04W 72/1278* (2013.01); *H04W 76/14* (2018.02); *H04W 72/1215* (2013.01); *H04W 88/02* (2013.01); *H04W 88/08* (2013.01)

(58) Field of Classification Search
CPC ........... H04W 56/002; H04W 72/0406; H04W 56/0025; H04W 72/02; H04L 67/104; H04L 27/2657; H04L 27/2655
See application file for complete search history.

(56) References Cited

U.S. PATENT DOCUMENTS

| | | | |
|---|---|---|---|
| 2012/0044815 A1* | 2/2012 | Geirhofer | H04W 52/243 370/248 |
| 2012/0093098 A1* | 4/2012 | Charbit | H04W 52/343 370/329 |
| 2012/0243431 A1 | 9/2012 | Chen et al. | |
| 2012/0243433 A1* | 9/2012 | Kneckt | H04W 56/002 370/252 |
| 2012/0322484 A1 | 12/2012 | Yu et al. | |
| 2013/0005377 A1 | 1/2013 | Wang et al. | |
| 2013/0150061 A1 | 6/2013 | Shin et al. | |
| 2013/0324114 A1 | 12/2013 | Raghothaman et al. | |
| 2014/0112194 A1* | 4/2014 | Novlan | H04W 8/005 370/254 |
| 2014/0206407 A1* | 7/2014 | Kim | H04W 8/005 455/515 |
| 2015/0009949 A1 | 1/2015 | Khoryaev et al. | |
| 2015/0016354 A1* | 1/2015 | Yie | H04W 76/14 370/329 |
| 2015/0016358 A1* | 1/2015 | Yie | H04W 76/14 370/329 |
| 2015/0043398 A1* | 2/2015 | Fwu | H04W 52/0219 370/280 |
| 2015/0080040 A1* | 3/2015 | Chang | H04W 48/16 455/500 |
| 2015/0117375 A1* | 4/2015 | Sartori | H04W 56/002 370/329 |
| 2015/0119056 A1* | 4/2015 | Lee | H04W 72/042 455/450 |
| 2015/0195828 A1* | 7/2015 | Fujishiro | H04W 48/16 370/329 |
| 2015/0264588 A1* | 9/2015 | Li | H04W 56/0015 370/350 |
| 2015/0296518 A1* | 10/2015 | Yi | H04W 72/042 370/336 |
| 2016/0014589 A1* | 1/2016 | Niu | H04W 48/16 370/329 |
| 2016/0128053 A1* | 5/2016 | Wei | H04W 72/048 455/450 |
| 2016/0150390 A1* | 5/2016 | Chen | H04W 76/14 370/311 |
| 2016/0157165 A1* | 6/2016 | Xie | H04W 48/16 455/434 |
| 2016/0174279 A1* | 6/2016 | Adachi | H04W 8/005 370/328 |
| 2016/0205644 A1* | 7/2016 | Seo | H04L 27/2613 370/350 |
| 2016/0309430 A1* | 10/2016 | Chae | H04W 56/00 |
| 2016/0316452 A1* | 10/2016 | Huang | H04W 4/80 |
| 2016/0345279 A1* | 11/2016 | Gunnarsson | H04W 4/70 |

FOREIGN PATENT DOCUMENTS

| | | |
|---|---|---|
| KR | 1020130065357 A | 6/2013 |
| WO | WO 2011-109027 A1 | 9/2010 |
| WO | WO 2013-036068 A1 | 3/2013 |
| WO | WO 2013-040070 A1 | 3/2013 |
| WO | WO 2013-062351 A1 | 5/2013 |
| WO | 2013-098461 A1 | 7/2013 |
| WO | WO 2013-102390 A1 | 7/2013 |
| WO | WO 2013-113371 A1 | 8/2013 |
| WO | WO 2013-162345 A1 | 10/2013 |
| WO | WO 2013-177447 A1 | 11/2013 |

OTHER PUBLICATIONS

Ericsson; "Synchronization Signals and Channel Design for D2D Discovery and Communication"; R1-135804; 3GPP TSG RAN WG1 Meeting #75; Nov. 11-15, 2013; San Francisco, US.

Huawei, Hisilicon; "System Considerations for D2D Synchronization"; R1-140050; 3GPP TSF RAN WG1 Meeting #76; Feb. 10-14, 2014; Prague, CZ.

Huawei, Hisilicon; "Design Considerations for D2DSS"; R1-140207; 3GPP TSG RAN WG1 Meeting #76; Feb. 10-14, 2014; Prague, CZ.

Huawei, Hisilicon; Considerations on timing and synchronization for D2D); R1-134072; 3GPP TSG RAN WG1 Meeting #74bis; Sep. 28, 2013; Guangzhou, CN.

EADS; "Public safety usage and impacts on synchronization"; R1-135402; 3GPP TSG RAN WG1 Meeting #75; Nov. 13, 2013; San Francisco, US.

TSG RAN WG1; "Draft Status Report to TSG; Study on LTE Device to Device Proximity Services—Radio Aspects"; RP-131617; 3GPP TSG Ran Meeting #62; Dec. 2, 2013; Busan, KR.

LG Electronics; "Discussion on design of D2DSS and PD2DSCH"; R1-135479; 3GPP TSG RAN WG1 Meeting #75; Nov. 11-15, 2013; San Francisco, US.

3GPP, Technical Specification Group RAN; "Study on LTE Device to Device Proximity Services-Radio Aspects (Release 12)"; 3GPP TR 36.843 v1.0.0 (R1-135998); Nov. 2013; Valbonne, FR.

Qualcomm Incorporated; "Details of synchronization procedure"; R1-145063; 3GPP TSG RAN WG1 #79; Nov. 17-21, 2014; San Francisco, US.

Qualcomm Incorporated; "LS on D2D Synchronization Procedure"; R1-145297; 3GPP TSG RAN WG1 #79; Nov. 17-21, 2014; San Francisco, US.

ZTE; "Resource Allocation of D2D Communication"; R1-134308; 3GPP TSG-RAN WG1, Meeting #74bis; Oct. 7-11, 2013; Guangzhou, China.

* cited by examiner

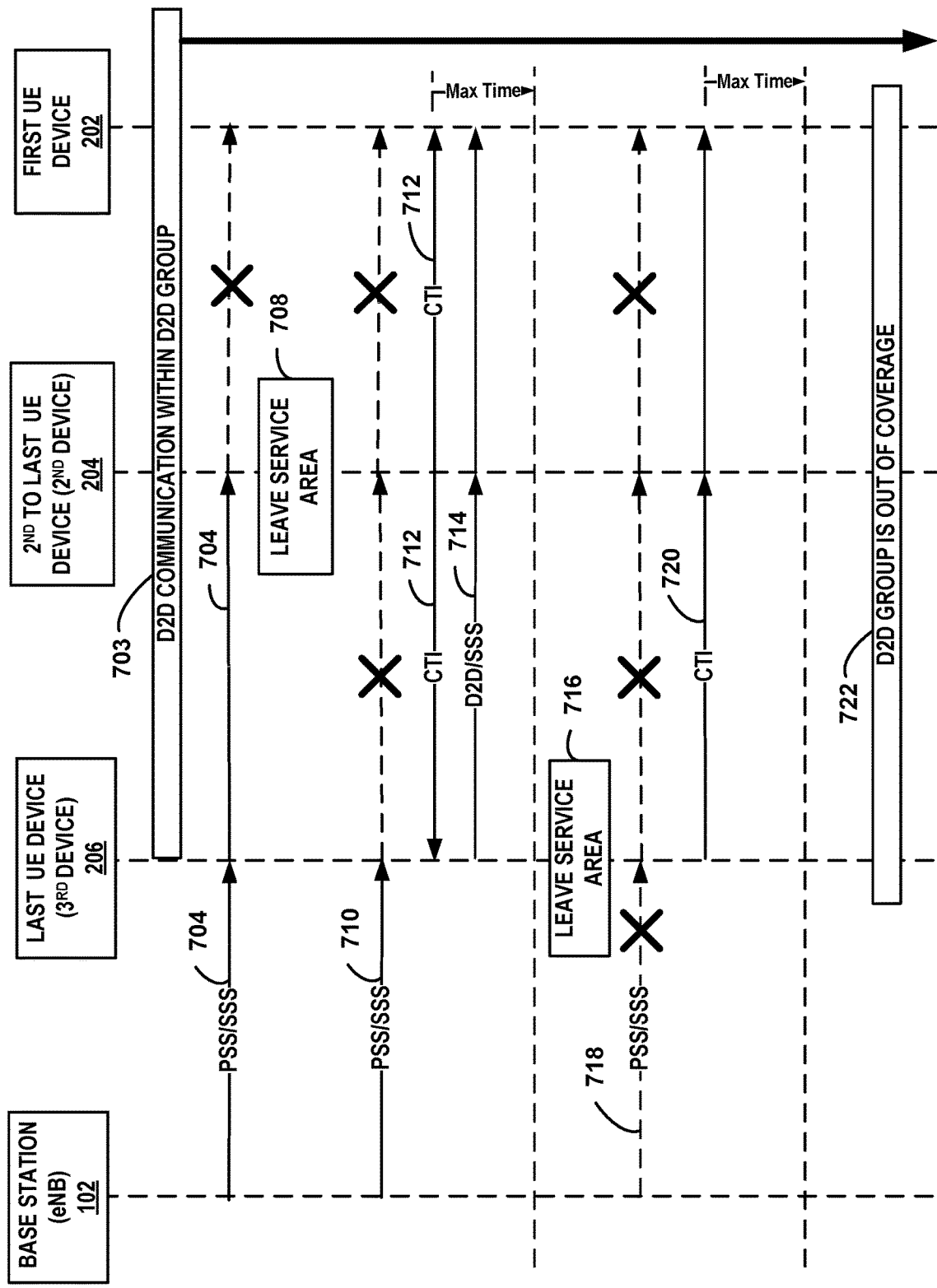

COVERAGE TRANSITION INDICATOR FOR DEVICE-TO-DEVICE COMMUNICATION

RELATED APPLICATIONS

The present application is a continuation of and claims priority to U.S. application Ser. No. 15/105,493, entitled "COVERAGE TRANSITION INDICATOR FOR DEVICE-TO-DEVICE COMMUNICATION" and filed on Jun. 16, 2016, which is a national stage application of PCT/US2014/071276, entitled "COVERAGE TRANSITION INDICATOR FOR DEVICE-TO-DEVICE COMMUNICATION" and filed on Dec. 18, 2014, which claims priority to Provisional Application No. 61/919,284 entitled "Scheduling for D2D Communications" and filed on Dec. 20, 2013, all assigned to the assignee hereof and hereby expressly incorporated by reference in their entirety.

FIELD

This invention generally relates to wireless communications and more particularly to management of device-to-device (D2D) communication resources.

BACKGROUND

Many wireless communication systems use communication stations (base stations, eNodeBs, eNBs) to provide geographical service areas where wireless communication user equipment devices (UE devices) communicate with the communication station providing the particular geographical service area in which the UE devices are located. The communication stations are connected within a network allowing communication links to be made between the wireless communication devices and other devices. The communication system may include communication stations that provide overlapping service areas of different sizes to serve various needs of mobile UE devices. For example, macrocell communications stations may provide macrocell service areas that are larger and may cover one or more small cell service areas provided by small cell communication stations.

In some circumstances, the communication links are between wireless communication UE devices that are close to each other. In these situations, it may be preferred to have a direct communication link between the two wireless UE devices rather than communicating through a base station. Such direct communication between devices is often referred to as device-to-device (D2D) communication or peer-to-peer (P2P) communication. The communication resources (e.g., time frequency blocks) used for D2D communication are typically a subset of the communication resources used by the communication system for communication between UE devices and the communication stations.

An in-coverage UE device (InC UE device) is a UE device that is within the service area of a communication station and is capable of communication with the communication station. An out-of-coverage UE device (OoC UE device) is a UE device that is not within a service area of any communication station. D2D UE devices that are engaged in D2D communication with each other form a D2D group. A D2D group, therefore, includes two or more D2D UE devices. There are five typical coverage scenarios that occur with D2D groups. In a first coverage scenario, all the UE devices of the D2D group are located in a service area of a single communication station. For the first scenario, therefore, all of the D2D UE devices of the D2D group are InC UE devices in a single service area. In a second coverage scenario, none of the UE devices of the D2D group are located inside any service area of any communication station. For the second scenario, therefore, all of the D2D UE devices of the D2D group are OutC UE devices. In a third coverage scenario, at least one of the UE devices of the D2D group is located in a service area of a single communication station and at least one D2D UE device of the group is outside all service areas. For the third scenario, therefore, at least one of the D2D UE devices of the D2D group is InC UE device in a single service area and at least one UE device is an OutC UE device. The third coverage scenario is sometimes referred to as a partial coverage scenario. In a fourth coverage scenario, at least one of the UE devices of the D2D group is located within a first service area of a first communication station and at least one D2D UE device of the group located within a second service area of a second communication station. For the fourth scenario, therefore, at least two of the D2D UE devices of the D2D group are InC UE devices in different service areas. In a fifth coverage scenario, at least one of the UE devices of the D2D group is located within a first service area of a first communication station, at least one D2D UE device of the group located within a second service area of a second communication station, and at least one UE device of the D2D group is an OoC UE device. For the fifth scenario, therefore, at least two of the D2D UE devices of the D2D group are InC UE devices in different service areas and at least one D2D UE device of the group is an OoC UE device. Other coverage scenarios are possible. Since the UE devices of a group are mobile, there are situations where the coverage scenario of a D2D group changes. For example, where only one UE device of a D2D group is in coverage and moves out of coverage, the coverage scenario changes from a partial coverage scenario to an out of coverage scenario.

SUMMARY

A User Equipment (UE) D2D device transmits a coverage transition indicator when the UE device leaves a service area of base station and is no longer in coverage. The coverage transition indicator at least indicates that the UE device has left the service area and is no longer in coverage. Based on the coverage transition indicator, a determination can be made as to whether the D2D group to which the UE device belongs has transitioned to an out of coverage scenario from a partial coverage scenario.

BRIEF DESCRIPTION OF THE DRAWINGS

FIG. 7 is message diagram of communications between UE devices and the base station.

DETAILED DESCRIPTION

Figure 1:
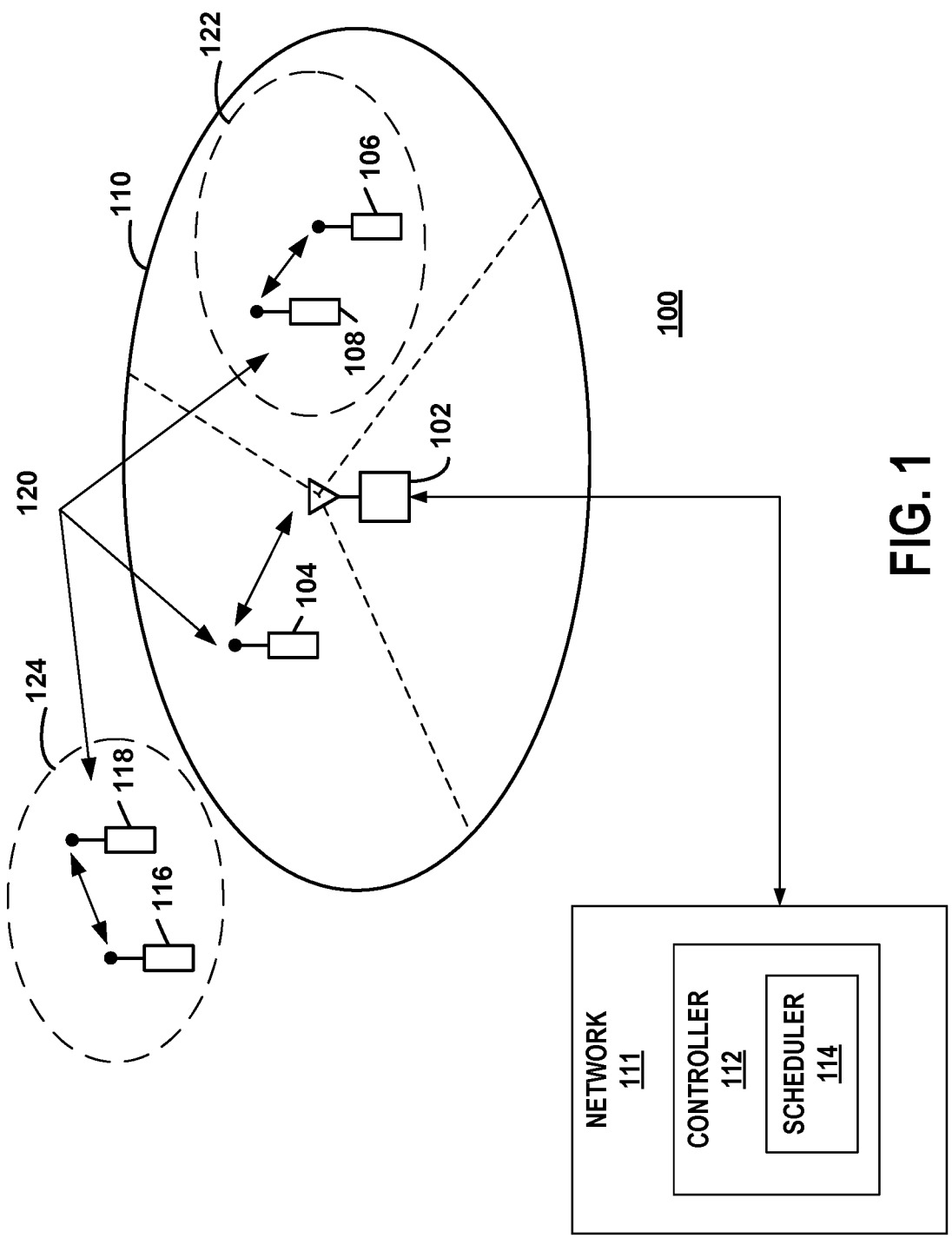
FIG. 1 is an illustration of a communication system where macrocell communication resources are used for device-to-device (D2D) communication.

FIG. 1 is an illustration of a communication system 100 where macrocell communication resources are used for device-to device (D2D) communication. A communication station (base station, eNodeB, eNB) 102 provides wireless communication services to wireless communication UE devices 104, 106, 108 within a geographical service area 110, sometimes referred to as a cell. Several communication stations are typically interconnected through a backhaul to provide several service areas to cover large areas. The various functions and operations of the blocks described with reference to the communication system 100 may be implemented in any number of devices, circuits, or elements. Two or more of the functional blocks may be integrated in a single device and the functions described as performed in any single device may be implemented over several devices. For example, at least some of the functions of the controller 112 may be performed by the communication station 102 and vice versa. A cellular communication system is typically required to adhere to a communication standard or specification. The Third-Generation Partnership Project Long-Term Evolution (3GPP LTE) communication specification is a specification for systems where base stations (eNodeBs) provide service to wireless communication devices (user equipment (UE) devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with a 3GPP LTE communication specification.

The communication station 102 is a fixed transceiver station, sometimes referred to as a base station, an eNodeB or eNB, which may include a controller in some circumstances. The communication station 102 is connected to a controller 112 within a network 113 through a backhaul which may include any combination of wired, optical, and/or wireless communication channels. For the examples herein, the controller 112 includes the functionality of the Mobility Management Entity (MME) and the Packet Gateway (P-GW). Accordingly, the controller 112 includes a scheduler 114. In the example, the scheduler 114 allocates time-frequency resources for communication between the wireless communication devices 104, 106, 108 as well as between the base station 102 and the wireless communication devices 104, 106, 108. Wireless UE communication devices 116, 118 outside of the geographic service area 110 are capable of receiving wireless service from the communication station 102 when the devices 116, 118 are within the service area 110. Since, the devices 116, 118, however, are out of range of the base station 102, communication resources cannot be scheduled for the devices 116, 118 when they are outside of the service area 110.

The wireless (UE) communication devices 104, 106, 108, 116, 118 (collectively UE devices 120) may be referred to as mobile devices, wireless devices, wireless communication devices, and mobile wireless devices, UEs, UE devices as well as by other terms. The UE devices 120 include electronics and code for communicating with base stations and with other wireless communication devices in device-to-device configurations. The wireless communication devices include devices such as cell phones, personal digital assistants (PDAs), wireless modem cards, wireless modems, televisions with wireless communication electronics, and laptop and desktop computers as well as other devices. The combination of wireless communication electronics with an electronic device, therefore, may form a UE device 120. For example, a UE device 120 may include a wireless modem connected to an appliance, computer, television, or other device.

As explained above, in some situations, two or more UE devices may communicate directly with each other without communication through a base station. Such device-to-device (D2D) communication may occur between UE devices within the service area of a base station or outside the service area. For the example discussed herein, the in coverage (InC) D2D UE devices 106, 108 are within the service area 110 and communicate with each other using D2D communication. Out of Coverage (OoC) D2D UE devices 116, 118 are outside of the service area 110 and communicate with each other using D2D communication.

The communication station 102 includes a wireless transceiver that can exchange wireless signals with the UE devices 104, 106, 108 within the service area 110. Transmissions from the base stations and from the UE devices 104, 106, 108 are governed by a communication specification that defines signaling, protocols, and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from a base station to a UE device 120.

A substantial portion of the macrocell communication resources are used for transmitting the downlink signals and the uplink signals. The communication station 102 transmits downlink signals to the wireless communication devices 104, 106, 108 using scheduled downlink communication resources of the defined downlink communication resources defined by the communication specification and reserved for downlink communication. The wireless communication devices transmit uplink signals to the communication station 102 using scheduled uplink communication resources of the defined uplink communication resources defined by the communication specification and reserved for uplink communication. The macrocell communication resources include frequency bands divided in time where each frequency band and segment of time can be identified by the scheduler 114 and described in control signals sent from the communication station 102 to the wireless communication devices 104, 106, 108. The communication specifications, or other system rules, therefore, define applicable communication resources for the downlink and applicable communication resources for the uplink. The scheduler 114 allocates different time-frequency resources to different devices to efficiently utilize the resources while minimizing interference. Accordingly, the scheduled macrocell communication resources used for signals exchanged with one wireless communication device are different from scheduled macrocell communication resources used for other signals exchanged with other wireless communication devices. As referred to herein, therefore, the defined macrocell communication resources are the communication resources reserved for communication by the specification and/or communication system rules. The scheduled resources for macrocell transmission for particular signals, however, are a subset of the reserved macrocell communication resources and are typically dynamically changed during operation.

In conventional systems, a scheduler allocates time-frequency resources for communication between the communication station and the UE devices. In the examples discussed herein, however, the scheduler 114 and/or a base station controller also at least partially manage time-frequency resources (D2D communication resources) for communication between wireless communication devices 106, 108 to establish and maintain a device-to-device (D2D) communication link. OoC UE devices, on the pother hand, select resources from reserved OoC D2D communication resources without direct scheduling by the scheduler. An example of D2D communication resource management is provided in patent application entitled MANAGEMENT OF DEVICE-TO-DEVICE COMMUNICATION RESOURCES, application no. PCT/US2014/071266, filed concurrently with this application and incorporated by reference herein.

D2D UE devices communicating with each other can be considered to be in a D2D group. In FIG. 1, for example, D2D UE device 106 and D2D UE device 108 are in a first D2D group 122 and D2D UE device 116 and D2D UE device 118 are in a second D2D group 124. In accordance with at least some 3GPP LTE specification revisions, each D2D group is associated by a unique Group ID.

Figure 2A:
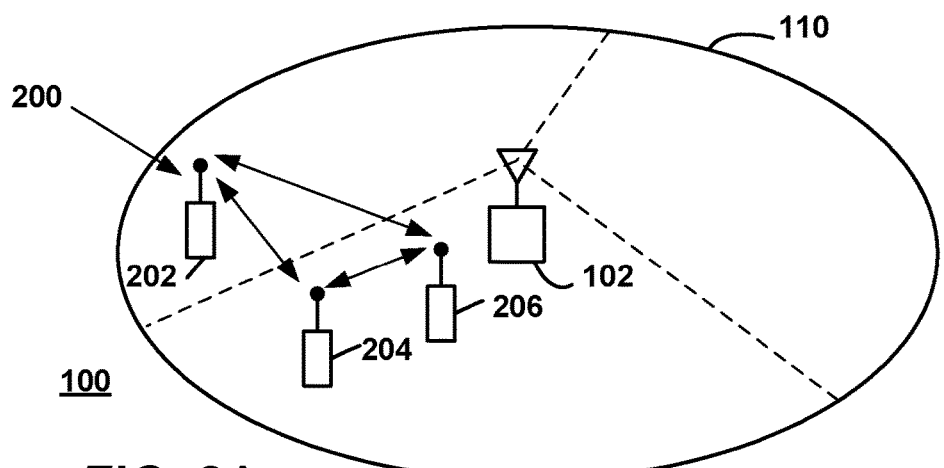
FIG. 2A is an illustration of the communication system with a D2D group in an in-coverage scenario.
Figure 2B:
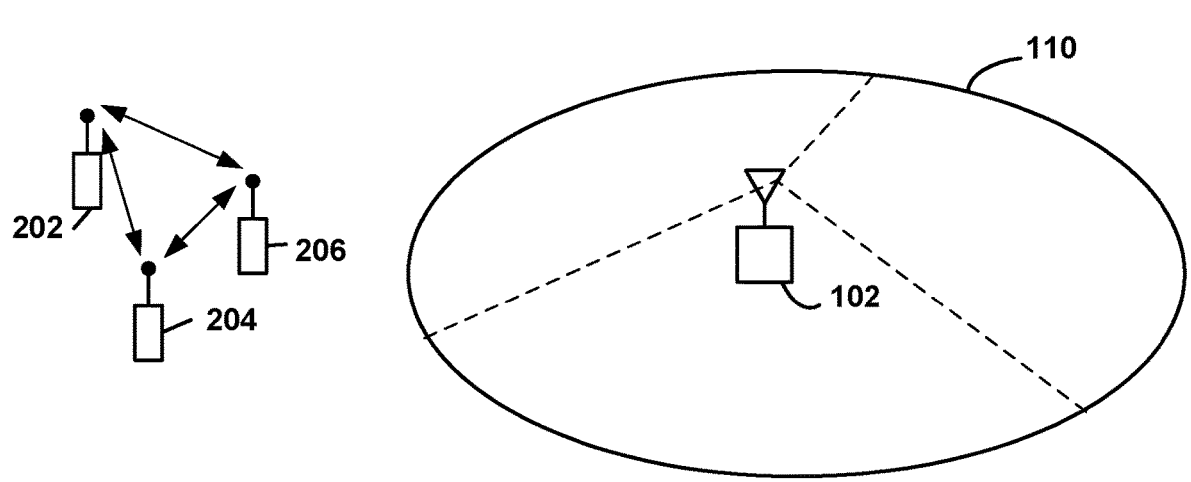
FIG. 2B is an illustration of the communication system with the D2D group in an out-of-coverage scenario.
Figure 2C:
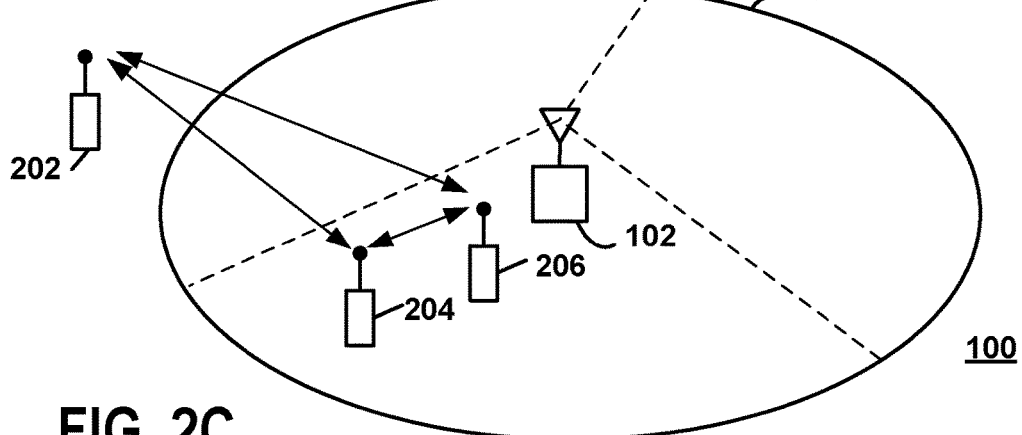
FIG. 2C is an illustration of the communication system with the D2D group in an partial coverage scenario.

FIG. 2A, FIG. 2B, and FIG. 2C are illustrations of the communication system 100 for different coverage scenarios of a D2D group 200. The D2D group includes D2D UE device 202, D2D UE device 204 and D2D UE device 206. A D2D group includes at least two UE devices. FIG. 2A is an illustration of the communication system 100 for the D2D group 200 for an in-coverage (InC) scenario. All UE devices 202, 204, 206 are within the service area 110 for the InC scenario. FIG. 2B is an illustration of the communication system 100 for the D2D group 200 for an out-of-coverage (OoC) scenario. All UE devices 202, 204, 206 are outside the service area 110 for the OoC scenario. FIG. 2c is an illustration of the communication system 100 for the D2D group 200 for a partial coverage scenario. During the partial coverage scenario, at least one UE device 202 is outside the service area 110 and at least one UE device 204, 206 is inside the service area.

Figure 3:
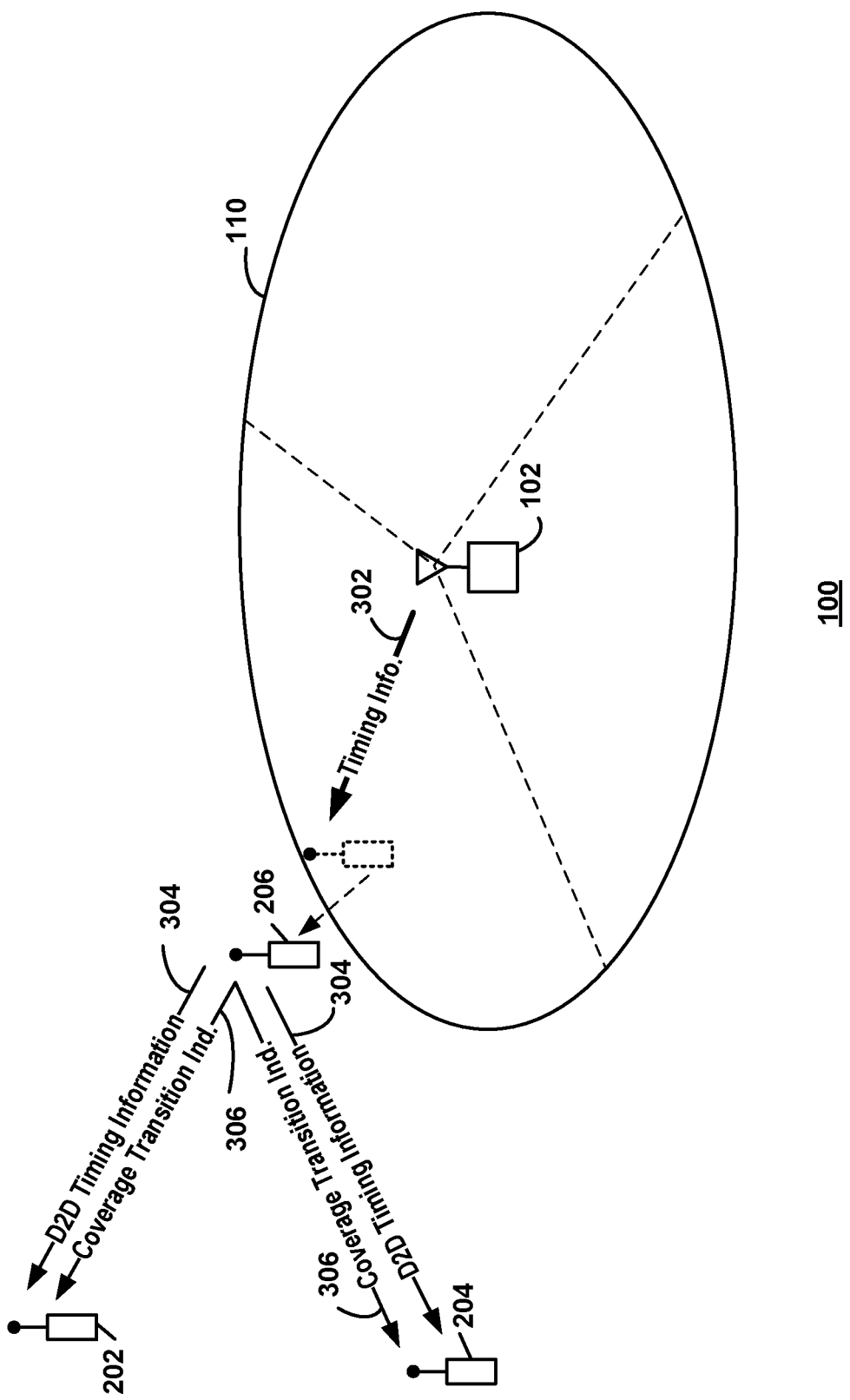
FIG. 3 is an illustration of the communication system where the D2D group is transitioning from a partial coverage scenario to an out-of-coverage scenario.

FIG. 3 is an illustration of the communication system 100 where the D2D group 200 is transitioning from a partial coverage scenario to an OoC scenario. For the example of FIG. 3, a first D2D UE device 202 and a second D2D UE device 204 are outside of the service area 110 a third UE D2D device 206 is transitioning from the service area 110 to outside the service area 110. In most circumstances, the D2D UE device is transitioning from the service area 110 because the device is moving out of the geographical area where the communication station provides service.

In order to synchronize D2D communication between D2D UE devices of a D2D group, at least one of the D2D UE devices in the D2D group transmits timing information. The timing information that a particular UE transmits may be derived directly from signals and information received at the UE device and transmitted by a communication station (e.g., eNodeB) connected to the network. In some situations, the timing information is determined in some other way. For example, if the UE device is outside of all coverage areas (service areas), the timing information may be determined from the last timing information received from a communication station when the UE device was in coverage or from timing formation received from another UE device. In some situations, D2D UE devices within a D2D group determine which UE device's timing information will be used for D2D communication between the UE devices of the group. Selection of the UE device that will provide timing for the group may be based on several factors. In most situations, the UE device determined to have the closest timing to the system timing is selected as the UE device that will provide the timing information for the group. For example, if one UE device is within coverage, and other UE devices of the group are out of coverage, the in-coverage UE device will provide the timing for the group. If all UE devices are out of coverage, the selection of the UE device for providing the timing may be based on the time elapsed since each UE device was is coverage.

In system operating in accordance with a 3GPP LTE specification (such as Release-12), the D2D timing information is provided using the D2DSS signaling. As is known, D2DSS is analogous to PSS/SSS channels that are transmitted from base stations to UE devices on downlink resources. D2DSS signals, however, are transmitted using SC-FDMA since D2D communication utilizes uplink communication resources. The UE devices use the D2DSS to determine frame and subframe boundaries, thereby, determining timing information. The D2DSS resources are available for all D2D data and control channel transmissions. Although a D2D UE has available resources for transmitting the D2DSS as configured by the base station, however, there may be situations where at least some of the D2D UE devices in a D2D group do not transmit D2DSS (i.e., timing information). For example, if the D2D group is in the InC scenario, all D2D UE devices in the D2D group are receiving PSS/SSS and are deriving timing information from the base station. As a result, there is no need to transmit D2DSS within the group.

In OoC scenarios, the D2D timing cannot be derived directly from system timing since none of the UE devices are receiving PSS/SSS from a base station. At least one D2D UE device in the group transmits D2DSS.

For partial coverage scenarios, the D2D timing is preferably provided by a D2D UE device that derives the timing from a communication station connected to the network. More specifically, at least one of the UE devices within coverage transits D2DSS based on the system timing relieved via PSS/SSS. When a D2D group transitions from a partial coverage scenario to an out of coverage scenario, the D2D UE device transmitting the timing information can no longer derive the timing information from the communication station. In other words, the transition from partial coverage to out of coverage occurs when the last UE device remaining in a service area moves out of the service area and cannot receive signals from the communication station. In many situations, this D2D UE device moving out of coverage would have been the D2D UE device providing the timing information since it was the last D2D UE deriving the timing information directly from the communication station before leaving coverage. If the InC UE device is not transmitting data, however, it typically does not transmit D2DSS. As a result, the last InC D2D UE device in the service area may not be transmitting the timing information for the D2D group. Some 3GPP LTE specification proposals and agreements at least contemplate UE devices transmitting a timing indicator that indicates whether the D2D timing information being transmitted by the UE device is derived from base station timing or in some other way. These timing indicators, however, can only be transmitted if D2DSS is transmitted from the UE device. Where a D2D UE device that is part of D2D group is in coverage but not transmitting D2DSS, it cannot be determined whether the D2D group is in an OoC scenario or a partial coverage scenario.

For the examples herein, a coverage transition indicator 306 is transmitted from the D2D UE device 206 when the D2D UE device has left a service area and is no longer in coverage. The indicator 306, therefore, also indicates that the D2D UE device is no longer deriving the timing information directly from the base station 102. The coverage transition indicator 306 is transmitted when the D2D UE device is leaving, or has recently left, the service area 110. The coverage transition indicator 306 facilitates the determination that all D2D UE devices of the D2D group are out of coverage. In response to the determination, the D2D UE devices in the D2D group can modify operation by, for example, using different communication resources for D2D communication.

For the example of FIG. 3, the third D2D UE device 206 is receiving signals 302 from the communication station 102 that allows the D2D UE device 206 to derive the system timing. In systems operating in accordance with a LTE 3GPP specification, for example, the third D2D UE device 206 receives PSS/SSS from the base station 102. The D2D UE device 206 transmits D2D timing information 304 to the D2D UE devices 202, 204 of the D2D group. The D2D UE device 206 also transmits a timing indicator 304 that allows the other D2D UE devices 202, 204 of the group to determine when the D2D UE device 206 is or is not deriving the D2D timing information 303 directly from the base station 102. For systems operating in accordance with some current and proposed 3GPP LTE specification revisions, the timing indicator 304 is a two bit flag that is transmitted within the D2DSS of the PD2DSCH. The system timing indicator 304 identifies how the D2D timing information is derived. Examples of characterizations that can be provided by a system timing indicator such as this include indications that the D2D timing information is derived from the system timing information, D2D timing information is derived from timing information received from another UE device, or that the D2D timing information is derived autonomously by the UE device. Other examples of characterizations include identifying the number of timing derivations from system timing. In other words, the timing indicator may identify the number of UE devices between the base station and the UE device transmitting the D2D timing information in some cases. Where the D2D timing information is derived directly from system timing, the number of UE devices is zero. Where the D2D timing information is derived from D2D timing information provided by another UE device that directly derived the D2D timing information from system timing, the number of UE devices is one.

A suitable implementation of the second format example of the system timing indicator 304 in a system operating in accordance with 3GPP LTE includes transmitting a two bit flag in the D2DSS where the flag is set to one of four states. For example, a first state (e.g., 00) may indicate that the D2DSS is derived from PSS/SSS received from a base station, a second state (e.g., 01) may indicate that the D2DSS is derived from another D2DSS received from another D2D UE device that derived the D2DSS from PSS/SSS, a third state (e.g., 10) may indicate that the D2DSS is derived from another D2DSS received from another D2D UE device that did not derive the D2DSS from PSS/SSS, and fourth state (e.g., 11) may indicate that the D2DSS was derived autonomously by the UE device.

Since the LTE specifications only require the transmission of D2DSS when the UE device transmits data, the timing indicator 304 is not a reliable indicator of whether any members of a D2D group remain in coverage. For example, if a D2D UE of group is in coverage but is not transmitting data, the UE device does not provide any indication if it remains in coverage. For the examples herein, however, a coverage transition indicator (CTI) 306 provides information that can be used to determine when a D2D group has transitioned from partial coverage scenario to an OoC scenario. The CTI 306 is transmitted when the UE device 206 moves out of coverage. Although the CTI 306 can be transmitted using any suitable message or signaling, the CTI is transmitted as a one bit flag in the D2DSS of the PD2DSCH in the example herein. Therefore, for the example, the CTI 306 is transmitted as part of the D2D timing information 304.

Figure 4A:
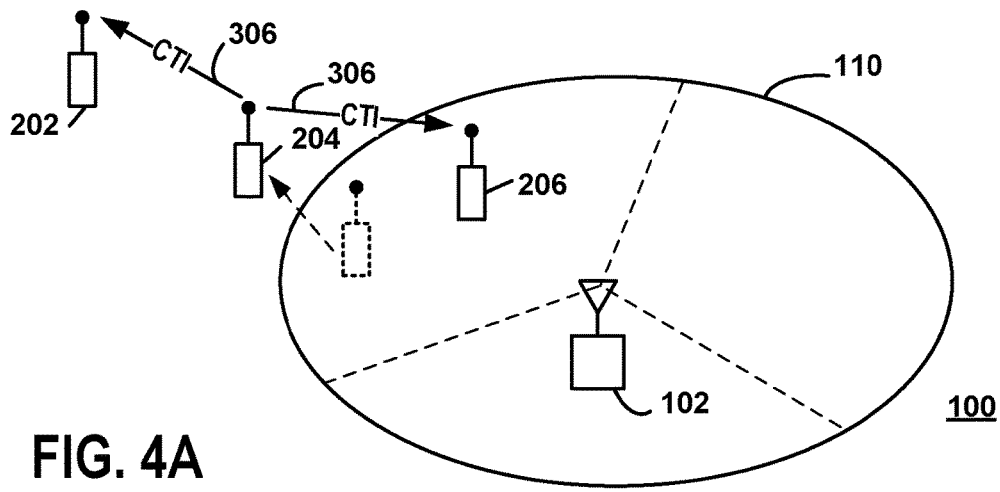
FIG. 4A is an illustration of a first stage of a transition of a D2D group from a partial coverage scenario to an out-of-coverage scenario where a coverage transition indicator (CTI) is transmitted by a second to last user equipment (UE) device to leave the service area.
Figure 4B:
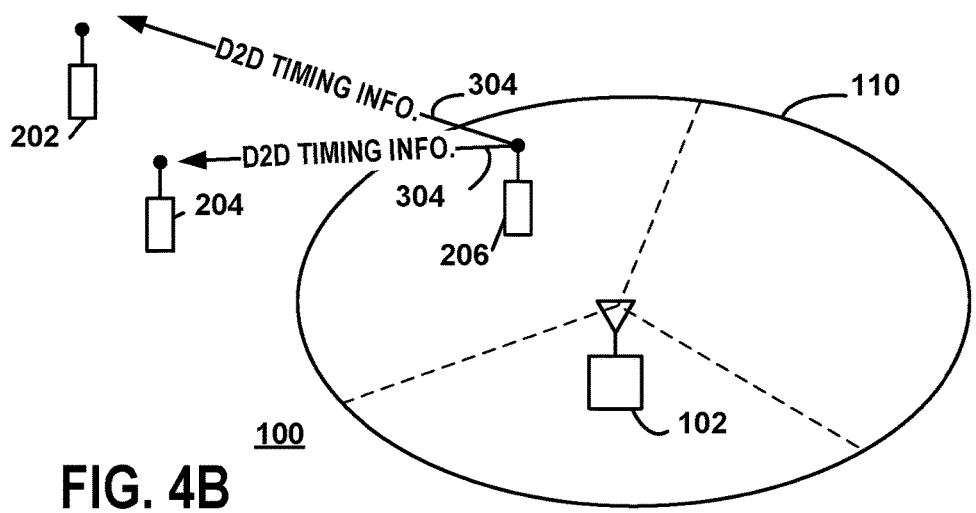
FIG. 4B is an illustration of a second stage of the transition of the D2D group from the partial coverage scenario to the out-of-coverage scenario where D2D timing information is transmitted in response to the CTI.
Figure 4C:
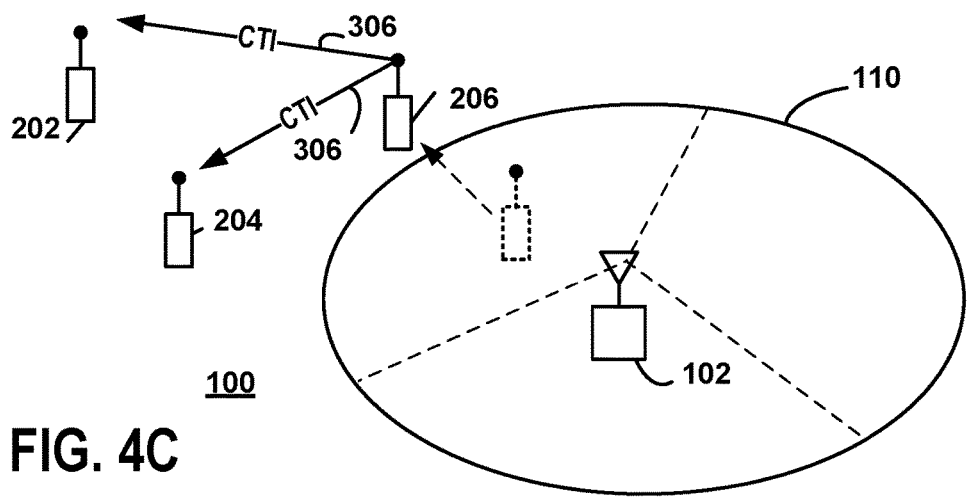
FIG. 4C is an illustration of a third stage of the transition of the D2D group from the partial coverage scenario to the out-of-coverage scenario where a CTI is transmitted by the last UE device to leave the service area.

FIG. 4A, FIG. 4B, and FIG. 4C are illustrations of stages of a transition of a D2D group from a partial coverage scenario to an OoC scenario where CTIs 306 are transmitted by UE devices 204, 206 as the UE devices 204, 206 exit the service area 110. The example of FIG. 4A-C shows a D2D group including three UE devices 202, 204, 206 where the group transitions from a partial coverage scenario with one UE device 202 that is out of coverage (OoC) to an OoC scenario where are all three UE devices are out of coverage (OoC). In FIG. 4A, the second to last UE device 204 to leave the service area transmits a CTI 306 after leaving the service area. For the example, the CTI 306 is transmitted with a Group ID identifying the D2D group. The Group ID uniquely identifies the D2D group such that the UE devices 202, 206 in the D2D Group can distinguish CTI transmissions from UE devices of other D2D groups from CTI transmissions of UE devices within the D2D Group. In some situations, transmission of the Group ID with the CTI can be omitted. For example, where the system allows for the UE devices to identify transmissions form D2D group members in some other way, the transmission of the Group ID may not be necessary. An example of a suitable technique for transmitting the Group ID includes transmitting the Group ID within the PD2DSCH.

In response to receiving the CTI 304, any InC UE device belonging to the D2D group and that is still in coverage transmits a response that at least indicates that it is part of the group and still in coverage. In the example herein, D2D UE devices remaining in coverage transmit D2D timing information such as D2DSS. FIG. 4B is an illustration of the example where the last UE device remaining in coverage responds to the CTI by transmitting the D2D timing information 304. The D2D timing information 304 is transmitted as D2DSS for systems operating in accordance with some 3GPP LTE specifications. The transmission also includes the Group ID and a timing indicator indicating that the D2DSS was derived directly from timing information receiving from the base station such as PSS/SSS. The response is transmitted within a minimum response period. An example of a suitable time for minimum time period is one second from the time the CTI 304 is received at the InC D2D UE device 206. The UE devices 202, 204 in the D2D group receive the response (D2D timing information) and recognize that the D2D group is still in a partial coverage scenario.

FIG. 4C is an illustration of the example when the last Inc UE device of the group leaves the service area 110 and is no longer in coverage. As with the second to last UE device discussed with reference to FIG. 4A, the UE device 206 transmits a CTI 206 indicating that it is no longer in coverage. For the example, the transmission also includes the Group ID. Therefore, the transmission is the same as the transmissions in FIG. 4A. Since, however, no UE devices of the group remain in coverage, no response is transmitted from InC UE devices of the group within the minimum time period for a response. When the minimum time period has elapsed and the UE devices 202, 204, 206 do not receive D2D timing information 304 that is derived directly from timing information transmitted by a base station, the UE devices 202, 204, 206 determine that the D2D group is in an OoC scenario. In other words, if no D2D timing information is received from an InC D2D UE device, the UE devices determine that the group is out of coverage. The UE devices can respond to the determination by adapting communication within the group. For the example, the UE devices 202, 204, 206 utilize different communication resources for D2D communication resources, For example, the UE devices of the D2D group can access a larger pool of resources than could be used when the D2D group was in a partial coverage scenario.

In the related patent application entitled MANAGEMENT OF DEVICE-TO-DEVICE COMMUNICATION RESOURCES, OoC UE devices use a reserved set of OoC D2D communication resources. By applying the principles herein to such a system, the D2D UE devices in the D2D group that transitions from partial coverage to out of coverage can detect the transition using the system timing indicator and transition from InC D2D communication resources to OoC D2D communication resources.

Figure 5:
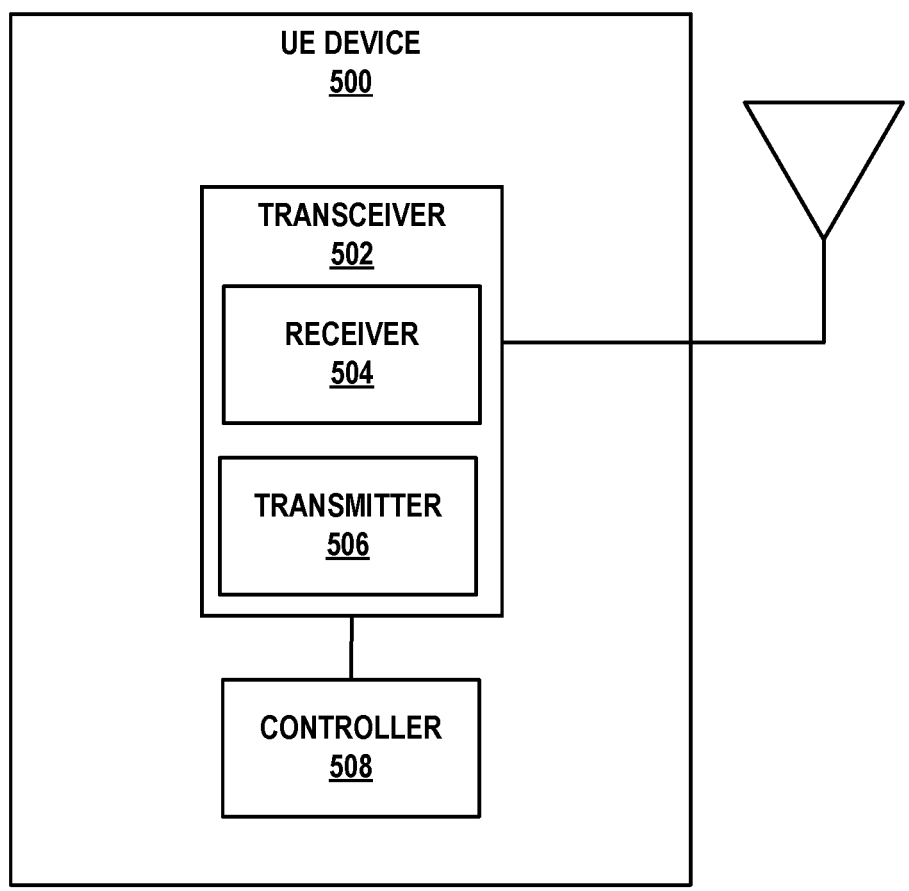
FIG. 5 is a block diagram of a wireless user equipment (UE) device 500 suitable for use as the UE devices.

FIG. 5 is a block diagram of a wireless user equipment (UE) device 500 suitable for use as the UE devices 202, 204, 206. Each of the UE devices includes a transceiver 502 a controller 504, as well as other components and circuitry (not shown) such as memory, for example. The transceiver 502 includes a transmitter 504 and a receiver 506. The transceiver 502 transmits uplink wireless signals to base stations and receives downlink wireless signals from the base stations. The transceiver can also be configured to transmit and receive D2D signals using allocated uplink communication resources. The controller 504 controls components of the mobile wireless communication device to manage the functions of the device described herein as well as to facilitate the overall functionality of the device 500. The controller 504 is connected to the transceiver 502 and other components such as memory.

Figure 6:
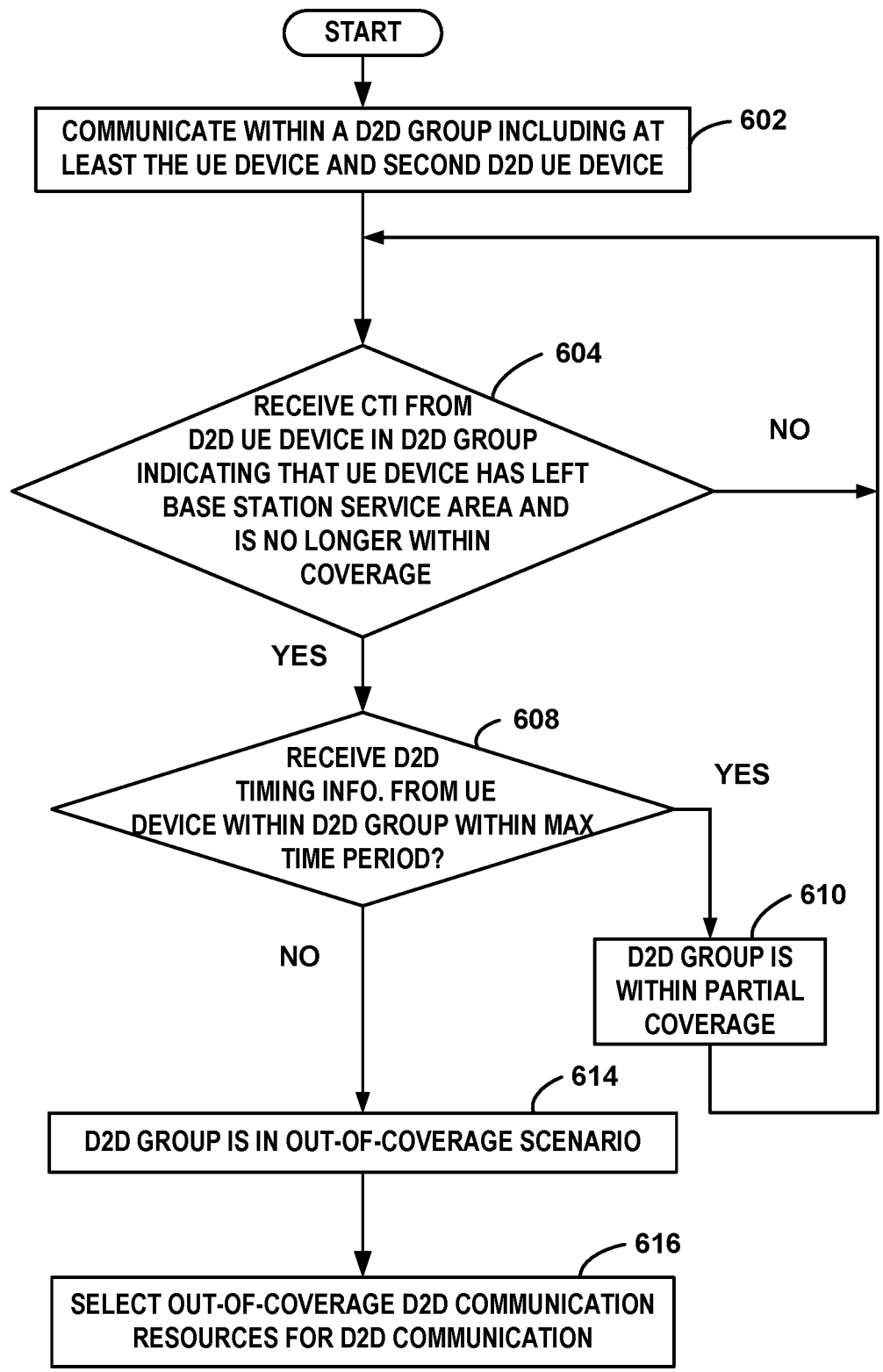
FIG. 6 is a flow chart of a method of performed at an out-of-coverage UE device that is communicating within a D2D group that is in partial coverage.

FIG. 6 is a flow chart of a method of performed at an out-of-coverage (OoC) UE device that is communicating within a D2D group that is in partial coverage. The example of FIG. 6, therefore, may be performed by the UE 202 in FIGS. 4A-4C.

At step 602, the UE device 202 is communicating within the D2D group where the D2D group includes at least one other D2D UE device. At least one UE device is in the base station service area. For the example, a second UE device of the group and a third UE device of the group are in the service area 110 of the base station 102.

At step 604, the UE device 202 determines if a coverage transition indicator (CTI) has been received from a D2D UE device in the D2D group. If a CTI indicator has been received, the procedure continues at step 608. Otherwise, the procedure returns to step 604 and the UE device continues monitoring the appropriate channels for a CTI. As discussed above, the CTI indicates that the UE device transmitting the CTI has left a base station service area and is no longer within coverage.

At step 608 it is determined whether any D2D timing information has been received within a maximum time period from a UE device within the D2D group. The controller 508 executes a timer from the time the CTI was received and determines whether D2D timing information is received from a D2D UE device in the group. As discussed above, the timing information is transmitted as a D2DSS and includes the Group ID in some circumstances. If no D2D timing information is received within the max time period, the procedure continues and step 614. Otherwise, the procedure continues at step 610.

At step 610, it is determined that the D2D group is still within partial coverage. Receipt of the D2D timing information from a UE device within the D2D group indicates that the UE device is still within coverage. As discussed above, a UE device of the group that is still in coverage and receiving PSS/SSS responds to receipt of a CTI from another group member UE by sending D2D timing information derived from the system timing from a base station (e.g., PSS/SSS). For the example herein, the D2D timing information includes, or is otherwise associated with, the Group ID. The Group ID can be sent in the PD2DSCH. For the examples, the D2D timing information is transmitted with a timing indicator indicating that the D2D timing is derived from system timing from a base station. As discussed above, this information can be transmitted within a 2 bit field in the PD2DSCH in some implementations If at step 608 it is determined that no D2D timing information from a D2D Group member has been received within the maximum time period, the method continues at step 614. At step 614 it is determined that the D2D group is in an out-of-coverage scenario where all D2D UE devices of the D2D group are outside of any service area.

At step 616, the UE device 202 selects resources from a pool of OoC D2D communication resources for D2D communication within the D2D group. The pool of OoC D2D communication resources is typically includes resources in addition to those available for partial coverage scenarios. Since all members of the D2D group are outside of base station service areas, the D2D UE devices are less likely to interfere with macrocell communications with a base station. In some situations, therefore, the UE devices may use any uplink communication resources after determination that the D2D group is in an 00C scenario. Where the UE device 202 is a member of multiple D2D groups, each group is treated independently such that the UE member may use OoC D2D communication resources with one group and more restricted pool of resources for D2D groups in partial coverage scenarios.

FIG. 7 is message diagram of communications between UE devices 202, 204, 206 and the base station 102. The example discussed with reference to FIG. 7 is an example of messaging for the example of FIGS. 4A-4C and FIG. 6.

At event 702, the UE devices 202, 204, 206 communicate within the D2D group. The down pointing arrow in FIG. 7 illustrates that the communication may continue as the other messaging and events of FIG. 7 occur. Although D2D communication is not necessarily continuous the three UE devices remain members of the D2D group. Also, some UE devices may not transmit signals during the D2D communication.

At transmission 704, the base station 102 sends timing information such as a PSS/SSS to the UE devices that are within the service area 110. Since the first UE device 202 begins the example as an OoC UE device, the first UE device 202 does not receive the PSS/SSS. Both the second UE device 204 and the third UE device 206, however are in coverage and receive the PSS/SSS. At event 708, the second UE device 204 leaves the service area 110. At transmission 710, the base station 102 again transmits the PSS/SSS. In the interest of brevity and clarity, some transmissions of PSS/SSS are omitted from FIG. 7. Accordingly, PSS/SSS may be transmitted more frequently than illustrated in FIG. 7. The PSS/SSS transmission 710 is not received by the first UE device 202 and the second UE device 204 since the two devices 202, 204 are out of the service area 110.

At transmission 712, the second UE device 204 sends a CTI which is received by the first UE device 202 and the third UE device 206. In response to the CTI, the third UE device transmits D2D timing information such as D2DSS at transmission 714. As discussed above, in the example discussed, the D2DSS includes the Group ID and a timing indicator indicating that the D2DSS was derived from the PSS/SSS. The D2DSS is transmitted with the maximum time period from the receipt of the CTI.

At event 716, the third UE device 206 leaves the service area 110. As a result the PSS/SSS at transmission 719 is not received by any of the UE devices 202, 204, 206. The third UE device 206 send a CTI at transmission 720 which is received at the second UE device 204 and the first UE device 202.

At event 722, the UE devices determine that the D2D group is out of coverage. Since no D2DSS is received from any D2D group members within the maximum time period the UE devices determine that no UE members remain in coverage. As discussed above, the UE devices may adjust D2D communication within the D2D group by, for example, using different communication resources for D2D communication.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method performed at a device-to-device user equipment (D2D UE), the method comprising:
  selecting a system timing indicator to be included into a D2D synchronization signal (D2DSS) for synchronization of D2D communication, from among a first indicator and a second indicator,
    wherein the first indicator indicates that the D2DSS is derived from a base station or derived from another D2D UE being in coverage of the base station, and
    the second indicator indicates that the D2DSS is derived from another D2D UE being out of coverage of the base station;
  transmitting the D2DSS including the selected system timing indicator;
  determining whether the D2D UE is in coverage of the base station; and
  transmitting a coverage indicator indicating whether the D2D UE is in coverage of the base station.

2. The method according to claim 1, wherein
  the selecting comprises selecting the system timing indicator from among the first indicator, the second indicator, and a third indicator, and
  the third indicator indicates that the D2DSS is derived autonomously by the D2D UE.

3. A device-to-device user equipment (D2D UE), comprising:
  a controller configured to select a system timing indicator to be included into a D2D synchronization signal (D2DSS) for synchronization of D2D communication, from among a first indicator and a second indicator,
    wherein the first indicator indicates that the D2DSS is derived from a base station or derived from another D2D UE being in coverage of the base station, and
    the second indicator indicates that the D2DSS is derived from another D2D UE being out of coverage of the base station;
  a transmitter configured to transmit the D2DSS including the selected system timing indicator;
  the controller further configured to determine whether the D2D UE is in coverage of the base station; and
  the transmitter further configured to transmit a coverage indicator indicating whether the D2D UE is in coverage of the base station.

4. The D2D UE according to claim 3, wherein
  the controller selects the system timing indicator from among the first indicator, the second indicator, and a third indicator, and
  the third indicator indicates that the D2DSS is derived autonomously by the D2D UE.

5. The method according to claim 1, wherein the system timing indicator comprises a two bit flag.

6. The D2D UE according to claim 3, wherein the system timing indicator comprises a two bit flag.

* * * * *